(12) United States Patent
Fletcher et al.

(10) Patent No.: US 8,694,027 B2
(45) Date of Patent: Apr. 8, 2014

(54) DETERMINING A POSITION OF A MOBILE DEVICE

(75) Inventors: Ben J. Fletcher, Huddersfield (GB); Gareth E. Jones, Winchester (GB); Matthew R Whitehead, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1401 days.

(21) Appl. No.: 11/857,463

(22) Filed: Sep. 19, 2007

(65) Prior Publication Data

US 2008/0076431 A1    Mar. 27, 2008

(30) Foreign Application Priority Data

Sep. 23, 2006 (GB) .................................. 0618784.3

(51) Int. Cl.
*H04W 24/00*    (2009.01)

(52) U.S. Cl.
USPC .................... 455/456.5; 455/456.1; 455/41.2; 455/517; 370/338

(58) Field of Classification Search
USPC ................. 455/41.1, 41.2, 553, 424, 422.1, 455/436–444, 404.2, 456.1–457, 517–519, 455/434; 370/328, 338
See application file for complete search history.

(56) References Cited

U.S. PATENT DOCUMENTS

| | | | |
|---|---|---|---|
| 6,795,688 B1 * | 9/2004 | Plasson et al. | 455/41.2 |
| 7,260,408 B2 * | 8/2007 | Friday et al. | 455/456.1 |
| 7,509,131 B2 * | 3/2009 | Krumm et al. | 455/456.1 |
| 7,936,736 B2 * | 5/2011 | Proctor et al. | 370/338 |
| 7,957,357 B2 * | 6/2011 | Tysowski et al. | 370/338 |
| 7,983,691 B1 * | 7/2011 | Wong et al. | 455/456.1 |
| 8,260,324 B2 * | 9/2012 | Jantunen et al. | 455/456.6 |
| 8,483,704 B2 * | 7/2013 | Nanda et al. | 455/456.1 |
| 8,509,199 B2 * | 8/2013 | Won | 370/338 |
| 2002/0095486 A1 * | 7/2002 | Bahl | 709/223 |
| 2003/0060212 A1 * | 3/2003 | Thomas | 455/456 |
| 2005/0063528 A1 * | 3/2005 | Pearson et al. | 379/211.01 |
| 2005/0185615 A1 * | 8/2005 | Zegelin | 370/331 |
| 2005/0221844 A1 * | 10/2005 | Trethewey et al. | 455/456.6 |
| 2005/0233748 A1 * | 10/2005 | Robinson et al. | 455/440 |
| 2007/0040742 A1 * | 2/2007 | Choi | 342/450 |
| 2007/0090965 A1 * | 4/2007 | McCall | 340/825.49 |
| 2008/0101283 A1 * | 5/2008 | Calhoun et al. | 370/328 |
| 2013/0190018 A1 * | 7/2013 | Mathews | 455/456.6 |

* cited by examiner

*Primary Examiner* — Sharad Rampuria
(74) *Attorney, Agent, or Firm* — Yee & Associates, P.C.; Yeen Tham

(57) ABSTRACT

A method, apparatus and software are disclosed in which the position of a mobile device is determined by proximity detection from a first node using one wireless communications protocol and the position of the first node is determined using a set of signals from base stations having known locations and using a second wireless communications protocol.

14 Claims, 3 Drawing Sheets

DETERMINING A POSITION OF A MOBILE DEVICE

CROSS-REFERENCE TO RELATED APPLICATIONS

This application claims the benefit of priority of United Kingdom Application No. 0618784.3 filed on Sep. 23, 2006, and entitled "A METHOD, APPARATUS OR SOFTWARE FOR DETERMINING A POSITION OF A MOBILE DEVICE" hereby incorporated by reference herein for all purposes.

BACKGROUND

1. Technical Field

The present invention relates to a method, apparatus or software for determining a position of a mobile device.

2. Description of Related Art

Current methods for establishing the location of a mobile device use a variety of techniques. For example, the mobile device may be equipped with a Global Positioning System (GPS) transceiver enabling the device to determine its position independently. The device may then transmit its position data via a GPS beacon or other wireless communications protocol. Another mechanism for locating a mobile device is to fit it with a proximity device such as Radio Frequency Identification (RFID) tag, which can be identified when it comes within range of an RFID base station. A further mechanism uses wireless signals received by the mobile device from a set of three or more base stations having known locations. Features of these received signals are then used in a triangulation mechanism to calculate the position of the mobile device.

A problem with RFID tags is that the specialised tag device needs to be added to every mobile device in the system and a corresponding specialised base station is also required. A problem with triangulation mechanisms, GPS or active beacon location systems is that they costly in terms of the limited resources of processor and battery power of the mobile device.

BRIEF SUMMARY

A method, apparatus, and article of manufacture for determining a position of a mobile device are described herein. According to one embodiment, a method is provided which comprises detecting the proximity of one or more mobile devices relative to a first node using a first wireless communications protocol at the first node; determining the location of the first node using a second wireless protocol at the first node. Thereafter, if a mobile device is detected within the proximity of the first node via the first communications protocol then data representing the location of the first node is stored as the location of the detected mobile device.

BRIEF DESCRIPTION OF THE DRAWINGS

Embodiments of the invention are described in more detail below, by way of example only, with reference to the accompanying drawings in which.

DETAILED DESCRIPTION OF AN ILLUSTRATIVE EMBODIMENT

According to various embodiments of the present invention, a method, apparatus, and article of manufacture for determining a position of a mobile device are described. According to one embodiment, a method is provided which comprises detecting the proximity of one or more mobile devices relative to a first node using a first wireless communications protocol at the first node; determining the location of the first node using a second wireless protocol at the first node. Thereafter, if a mobile device is detected within the proximity of the first node via the first communications protocol then data representing the location of the first node is stored as the location of the detected mobile device.

The first wireless protocol may be used at the first node to scan for the mobile devices and by the mobile devices to respond to the scan. In response to the scan, an identifier may be received from any discoverable mobile device within the proximity of the first node and the identifier is stored associated with the location data for the detected mobile device. The first node may refer to an access list identifying one or more mobile devices having a predetermined relationship with the first node, and then only the locations for mobile devices on the access list are stored.

Data indicating the strength of the first communications protocol signal, between the mobile device and the first node at the time of the detection of the mobile device, may be stored associated with the location data. Data representing the range of the first communications protocol may be stored associated with the location data. The first node may determine the location by applying a triangulation mechanism to a set of the second communications protocol signals each received from one of a plurality of second nodes having known locations. The second nodes may be wireless access points for a network. The first communications protocol may be a wireless personal area network protocol. The second communications protocol may be a wireless local area network protocol. The first node may transmit the location data and any associated data to a third node in the network. The location data may be disseminated by a publish and subscribe message broker.

Figure 1:
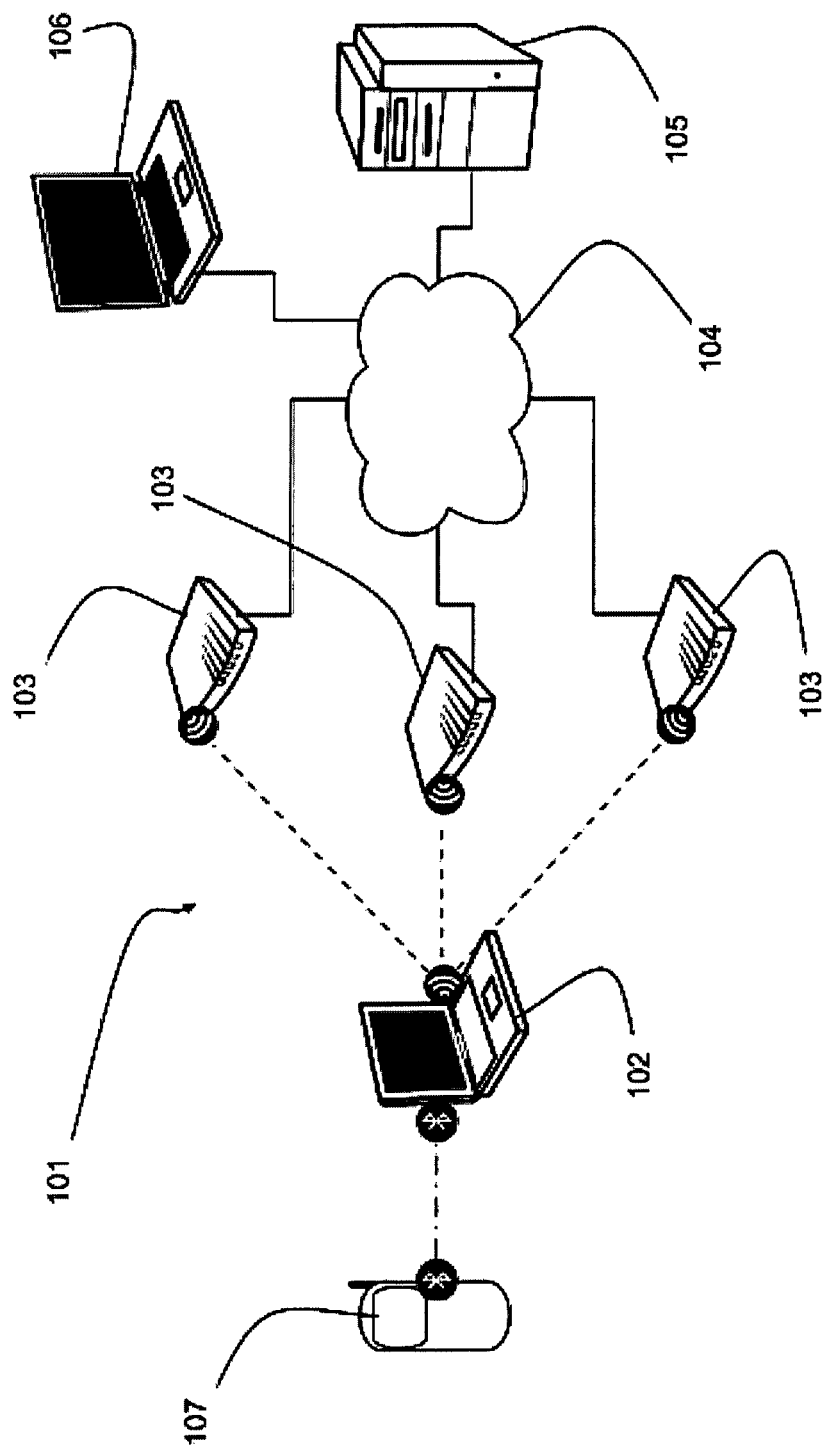
FIG. 1 is a schematic illustration of a communications network.

With reference to FIG. 1, a communications system 101 comprises a first node in the form of a laptop computer 102 wirelessly connected to a set of second nodes in the form of wireless base stations 103. Wireless base stations 103 are connected to a network 104 which interconnects base stations 103 with a third node, in the form of a server computer 105, and a fourth node in the form of client computer 106. Laptop computer 102 is equipped to connect to base stations 103 via a wireless communications protocol in the form of a wireless local area network protocol (WLAN). Laptop computer 102 is also equipped with another wireless communications protocol in the form of a wireless personal area network protocol (PAN). In the described embodiment, the WLAN is provided by a WiFi™ system in accordance with the IEEE 802.11g standard and the PAN is provided by the Bluetooth™ system, also known as the IEEE 802.15.1 standard.

The Bluetooth PAN based on laptop computer 102 operates over a predefined maximum area or proximity around laptop 102. This area is governed by the class of Bluetooth™ network employed as set out in the table below:

| Bluetooth ™ Device Class | Power Limit (mW) | Power Limit (dB) | Range (approximate) |
|---|---|---|---|
| Class 1 | 100 mW | 20 dBm | 100 m |
| Class 2 | 2.5 mW | 4 dBm | 10 m |
| Class 3 | 1 mW | 0 dBm | 1 m |

In the described embodiment, laptop 102 is equipped with a Class 2 Bluetooth™ device. The laptop computer comprises software, which provides a positioning application program. This program is arranged to use the Bluetooth™ device to scan its proximity for other devices, such as a mobile device in the form of a mobile phone 107, which are correspondingly equipped with Bluetooth™. Any Bluetooth™ enabled device that is discoverable, such as mobile phone 107, will respond to the scan by revealing the mobile device's Bluetooth™ name or identifier. This mobile device identifier is detected and recorded by the positioning application. The positioning application is then arranged to record the position of mobile phone 107 as the same as that of computer 102. In other words, the position of mobile device 107 is in the proximity of computer 102, where the proximity is determined by the range of the Bluetooth device, that is, 10 m.

The positioning application also employs a trigonometrical technique, in the form of triangulation, which uses a facet of the received WiFi™ signal, in the form of signal strength, to establish the position of laptop 102. The WiFi™ signals used are those from base stations 103. Typically the WiFi™ system, in accordance with the IEEE 802.11g, will have an indoor range of approximately 30 m, with the signal strength giving a relative approximation of the position for laptop 102 from each of base stations 103. Given the known and fixed positions of base stations 103, the software on laptop 102 can establish its position and thus the approximate position of mobile phone 107. In the described embodiment, laptop 102 is also mobile and therefore the positioning application is arranged to periodically re-determine the position of laptop 102 using the base station signals.

The positioning application is equipped with an access list provided by a system administrator. The access list comprises the set of Bluetooth™ identifiers for which the software will record position data. The location and identities of the mobile devices it detects in its proximity are transmitted to server computer 105. Server computer 105 provides this location data on request to client computer 106 via an access controlled web page. The positioning application is arranged to update the location data on server 105 as and when it changes. When a mobile device is first detected, or fails to be detected after having been recently detected, this information is passed to server 105. Thus continuous detection of a device is not repeatedly reported to server 105. In order to provide this function, the positioning application holds a running list of detected mobile devices (referred to herein as the device list) and checks against this list after each scan to add newly detected devices and to determine if any previously detected devices have left the proximity of laptop 102.

Figure 2:
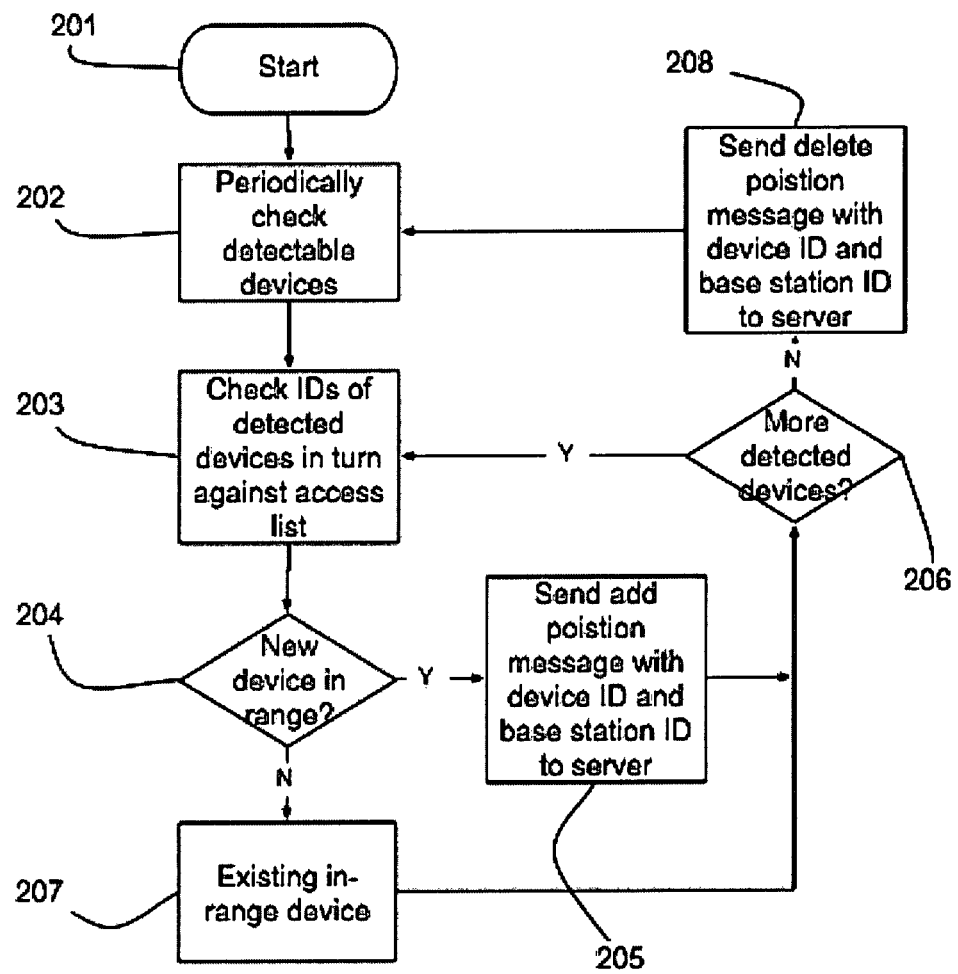
FIG. 2 is a flow chart illustrating processing carried out by a node in the network of FIG. 1.

The processing carried out by the positioning application will now be described further with reference to the flowchart of FIG. 2. At step 201, the application is started up and provided with its access list. Processing then moves to step 202 where the proximity is scanned for discoverable Bluetooth™ devices. Then, for each detected device in turn, the processing moves to step 204 and checks the device list for the identifier of the detected device. If the detected device is a newly detected device then processing moves to step 205 where the identifier for the device is added to the device list and sent to the server computer 105 along with its position as that of laptop computer 102. Processing then moves to step 206 where if there are further detected devices from the last scan still to be processed, processing returns to step 203.

If at step 204 the identifier of the device was already on the device list then processing moves through step 207 to return to step 206 as described above, effectively ignoring the repeat detection of the device. If at step 206, there are no further detected devices to be processed, processing moves to step 208, where any entries on the device list which are not either newly added or repeated are treated as missing and removed from the list. The identifiers of the removed devices are sent to the server 105 in the form of a delete message to indicate that those devices are no longer detectable in the proximity of the laptop 102. Processing then returns to step 202 and continues as described above.

In another embodiment, the server 105 comprises a collating application program arranged to receive positioning data from a set of computers 102 each running a positioning application substantially as described in the above embodiment. However, in the present embodiment, in addition to the position data for each detected device, the positioning applications are arranged to also include the signal strength of the Bluetooth™ signal at or around the time at which a given device was detected. The collating application is then arranged to monitor the incoming detection data for position data for the same device originating form three or more different computers 102, which indicates that a given device is in the proximity of those computers 102. The collating application is then arranged to use the trigonometrical technique, in the form of triangulation, to refine the position of the device based on the known positions of computers 102 and each reported Bluetooth™ signal facet. The refined position data is used by the collating application to update the original position data for the relevant mobile device on server 105.

Figure 3:
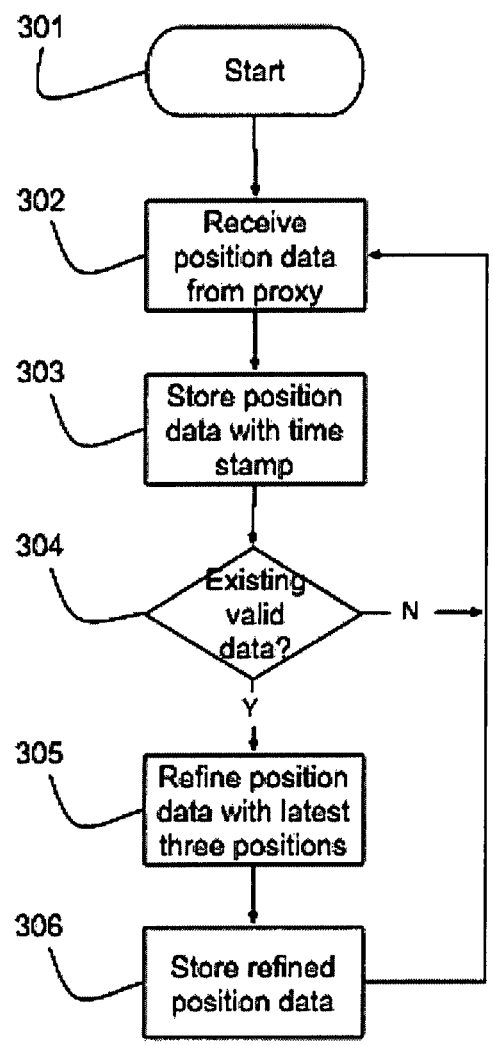
FIG. 3 is a flow chart illustrating processing carried out, in another embodiment, by another node of the network of FIG. 1.

The processing carried out by the collating application will now be described further with reference to the flow chart of FIG. 3. At step 301, the collating application is initialized and processing moves to step 302 where it awaits position data from any of the positioning applications running on computers 102. When data is received, processing moves to step 303 where the position data is stored along with a time stamp and processing moves to step 304. At step 304, the stored position data is searched for entries identifying the same mobile device received from at least three different computers 102 within a predetermined time limit. In the described embodiment, the time limit is one second. If no such data is identified then processing returns to step 302 and continues as described above. If three or more sets of position data are identified as described above then processing moves to step 305 where the Bluetooth™ signal strength data is used in conjunction with the known positions of relevant computers 102 to refine the position data for the relevant mobile device using triangulation. Processing then moves to step 306 where the refined data is stored in server computer 105 in place of each occurrence of the original data. Processing then returns to step 302 and continues as described above.

As will be understood by those skilled in the art, the Bluetooth™ name of a mobile device may not be unique, as it may be modified by a user. Therefore, if the Bluetooth™ name is used as the only identifier for mobile devices in the systems described above, an administration task can be introduced to ensure that no two devices have the same Bluetooth™ name.

In another embodiment, each mobile device identified from the original scan by computer 102 provides its Bluetooth™ address for use in the systems described above as a unique identifier for the mobile device. In a further embodiment, the Bluetooth™ pairing feature may be used to improve the security of the system by ensuring that each mobile device permitted to use the system is paired with each of computers 102.

In another embodiment, when a mobile device is detected in the proximity of a computer 102, the position application is arranged to store data representing the signal range of the Bluetooth™ device being used at the time the mobile device is detected. This range data is provided along with the position data to provide an indication of the actual proximity of the mobile device from the detecting computer. Different Bluetooth™ devices in the system may be arranged to operate in different classes and thus have different ranges.

In a further embodiment, the range data is used, instead of the signal data described above with reference to FIG. 3, by the collating application to refine the position data. In another embodiment, the range data is used in conjunction with the signal strength data by the collating application to further refine the position data. In another embodiment, each positioning application program is arranged to periodically operate its corresponding Bluetooth™ hardware at different ranges so as to further determine the actual proximity of any detected mobile device. For example, if a scan with a range of 10 m reveals two devices, and further a scan with a range of 1 m soon after reveals only one of those devices, it can be assumed that one device is within a proximity of 1 m and the other within 10 m.

In a further embodiment, no access list or controls are performed thus enabling the system to report the position of any discoverable device.

In another embodiment, the triangulation of the WLAN signal facets is carried out remotely from laptop computer 102. In a further embodiment, the WLAN signals are used to provide the location of the laptop computer and not to provide any network connectivity to computer 102. In other words, the WLAN signals from known base station locations are used by the positioning application as positioning beacons. In another embodiment, base stations at known locations using other wireless communications protocols are used as reference points. Examples of such protocols comprise Global System for Mobile Communications (GSM), General Packet Radio Service (GPRS), Bluetooth™, or Infrared Data Association (IrDA). Not all of the signals used by the positioning application need be of the same protocol.

The triangulation mechanism used by the positioning or collating applications described above may be provided by an application program called Place Lab™, supplied by Place Lab™, a commercial extension of Intel™ Research, part of the Intel™ Corporation.

Embodiments of the invention enable determination of the approximate position of mobile devices, which have limited processing and battery resources, without the need for the device to maintain an open network connection or to transmit a beacon signal. Furthermore, processing of any positioning data is devolved to computer 102, which acts as a proxy for the mobile device. Thus the position of the mobile device can be determined to a satisfactory degree without significant depletion of its resources. Many mobile devices such as mobile telephones or laptop computers are factory fitted with wireless PAN protocols, such as Bluetooth™, which will enable proximity detection as described above. Similarly, many computers are fitted with WLAN hardware such as WiFi™, which can then be employed in series with the wireless PAN protocol to enable the resource rich device to act as a positioning proxy for the resource poor device as described in the above embodiments.

As will be understood by those skilled in the art, the triangulation techniques or mechanisms referred to herein may be substituted for other geometry based positioning methods capable of using one or more facets or features of a received or transmitted wireless signal. For example, trilateration, multilateration or hyperbolic positioning may be used in place of triangulation.

It will be understood by those skilled in the art that an apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicants' general inventive concept.

What is claimed is:

1. A method for approximating a location of a mobile device, the method comprising:
   receiving, by a computer, a plurality of wireless local area network communication signals, each signal being received from one of a plurality of base stations, wherein each of the plurality of base stations has a known location;
   identifying, by the computer, a signal strength for each of the plurality of wireless local area network communication signals;
   determining, by the computer, a location of the computer from the signal strength for each of the plurality of wireless local area network communication signals and the known location of each of the plurality of base stations;
   scanning, by the computer, for one or more mobile devices within a proximity of the computer, wherein the scanning utilizes a personal area network communication protocol;
   responsive to scanning for one or more mobile devices, detecting, by the computer, one or more mobile devices within the proximity using the personal area network communication protocol;
   storing, by the computer, an identifier of the one or more mobile devices and the location of the computer in an access list as data representing a location of the one or more mobile devices.

2. The method of claim 1, wherein the personal area network protocol is used at the computer to perform a scan for the one or more mobile devices and by the one or more mobile devices to respond to the scan.

3. The method of claim 2 wherein, in response to the scan, the identifier of the one or more mobile devices is received from the one or more mobile devices, each identifier is stored in the access list as data representing the location of the one or more mobile devices, and the access list is sent to a collating application executing on a server computer, wherein the collating application is configured to receive location information from a set of computers.

4. The method of claim 1, wherein the access list identifies a mobile device of the one or more mobile devices having a predetermined relationship with the computer, wherein the step of storing the identifier of the one or more mobile devices further comprises-storing data representing the location of the computer as a location of only the mobile device having the predetermined relationship with the computer.

5. The method of claim 3, further comprising storing data representing a signal transmission range of the personal area network communication protocol is stored with said data representing the location of the one or more mobile devices.

6. The method of claim 1, wherein said plurality of base stations comprises wireless access points for a network.

7. The method of claim 1, wherein the personal area network communication protocol comprises a Class 2 Bluetooth communication protocol.

8. The method of claim 1, wherein the plurality of wireless local area network communication signals comprises a WiFi wireless local area network protocol.

9. The method of claim 1, said method further comprising:
receiving, by a second computer, a second plurality of wireless local area network communication signals, each second signal being received from one of the plurality of base stations;
identifying, by the second computer, a second signal strength for each of the second plurality of wireless local area network communication signals;
determining, by the second computer, a location of the second computer from the second signal strength for each of the second plurality of wireless local area network communication signals and the known location of each of the plurality of base stations;
detecting the one or more mobile devices within a proximity of a second computer within a predetermined time period using the personal area network communication protocol at the second computer;
determining said location of said one or more mobile devices using data representing the location of the computer and data representing the location of the second computer.

10. The method of claim 1, further comprising disseminating data representing the location of the one or more mobile devices using a publish and subscribe message broker.

11. An apparatus comprising:
a computer readable storage medium having a plurality of instructions executable by a machine embodied therein;
a bus connecting the computer readable storage medium to a processor;
a processor, wherein the processor executes the plurality of instructions:
to receive a plurality of wireless local area network communication signals, each signal being received from one of a plurality of base stations, wherein each of the plurality of base stations has a known location;
to identify a signal strength for each of the plurality of wireless local area network communication signals;
to determine a location of the computer from the signal strength for each of the plurality of wireless local area network communication signals and the known location of each of the plurality of base stations;
to scan for one or more mobile devices within a proximity of the computer, wherein the scanning utilizes a personal area network communication protocol;
responsive to scanning for one or more mobile devices, to detect one or more mobile devices within the proximity using the personal area network communication protocol;
to store an identifier of the one or more mobile devices and the location of the computer in an access list as data representing a location of the one or more mobile devices.

12. The apparatus of claim 11, wherein the processor further executes the plurality of instructions:
to receive a second plurality of wireless local area network communication signals, each second signal being received from one of the plurality of base stations;
to identify a second signal strength for each of the second plurality of wireless local area network communication signals;
to determine a location of the second computer from the second signal strength for each of the second plurality of wireless local area network communication signals and the known location of each of the plurality of base stations;
to detect the one or more mobile devices within a proximity of a second computer within a predetermined time period using the personal area network communication protocol at the second computer;
to determine said location of said one or more mobile devices using data representing the location of the computer and data representing the location of the second computer.

13. A non-transitory computer readable storage medium having a plurality of instructions executable by a machine embodied therein, wherein said plurality of instructions when executed cause said machine to perform a method comprising:
receiving, by a computer, a plurality of wireless local area network communication signals, each signal being received from one of a plurality of base stations, wherein each of the plurality of base stations has a known location;
identifying, by the computer, a signal strength for each of the plurality of wireless local area network communication signals;
determining, by the computer, a location of the computer from the signal strength for each of the plurality of wireless local area network communication signals and the known location of each of the plurality of base stations;
scanning, by the computer, for one or more mobile devices within a proximity of the computer, wherein the scanning utilizes a personal area network communication protocol;
responsive to scanning for one or more mobile devices, detecting, by the computer, one or more mobile devices within the proximity using the personal area network communication protocol;
storing, by the computer, an identifier of the one or more mobile devices and the location of the computer in an access list as data representing a location of the one or more mobile devices.

14. The non-transitory computer readable storage medium of claim 13, said method further comprising:
receiving, by a second computer, a second plurality of wireless local area network communication signals, each second signal being received from one of the plurality of base stations;

identifying, by the second computer, a second signal strength for each of the second plurality of wireless local area network communication signals;

determining, by the second computer, a location of the second computer from the second signal strength for each of the second plurality of wireless local area network communication signals and the known location of each of the plurality of base stations;

detecting the one or more mobile devices within a proximity of a second computer within a predetermined time period using the personal area network communication protocol at the second computer;

determining said location of said one or more mobile devices using data representing the location of the computer and data representing the location of the second computer.

* * * * *